(12) United States Patent
Sato et al.

(10) Patent No.: US 6,399,168 B1
(45) Date of Patent: Jun. 4, 2002

(54) DECORATIVE TAPE ADHESIVE MOLDING

(75) Inventors: Koichi Sato, Nishikasugai-gun; Katsushi Ito, Nakashima-gun; Junji Koizumi, Nagoya; Sadao Nada, Inazawa; Tetsumi Ichioka, Mie-gun, all of (JP)

(73) Assignee: Toyoda Gosei Co., LTD, Nishikasugai-gun (JP)

( * ) Notice: Subject to any disclaimer, the term of this patent is extended or adjusted under 35 U.S.C. 154(b) by 0 days.

(21) Appl. No.: 09/438,292

(22) Filed: Nov. 12, 1999

(30) Foreign Application Priority Data

Nov. 27, 1998 (JP) ............................ 10-338132

(51) Int. Cl.$^7$ ................... B32B 25/08; B32B 27/30; B32B 27/32; B32B 27/36
(52) U.S. Cl. .................... 428/31; 428/200; 428/201; 428/421; 428/422; 428/480; 428/515; 428/516; 428/542.6; 428/914
(58) Field of Search .............. 428/31, 200, 355 EN, 428/355 BL, 421, 422, 480, 515, 516, 542.6, 914, 201

(56) References Cited

U.S. PATENT DOCUMENTS

| | | | |
|---|---|---|---|
| 4,515,649 A | * 5/1985 | Nussbaum | 156/244.11 |
| 4,908,285 A | * 3/1990 | Kushibiki et al. | 430/1 |
| 5,725,712 A | * 3/1998 | Spain et al. | 156/230 |
| 6,060,135 A | * 5/2000 | Service | 428/31 |

FOREIGN PATENT DOCUMENTS

| | | |
|---|---|---|
| JP | 4-10 | 1/1992 |
| JP | 7-35792 | 8/1995 |

* cited by examiner

*Primary Examiner*—Paul Thibodeau
*Assistant Examiner*—Ramsey Zacharia
(74) *Attorney, Agent, or Firm*—Pillsbury Winthrop LLP

(57) ABSTRACT

A decorative tape adhesive molding in which a decorative tape are integrally fusion-bonded to a molding body. A molding body forming material is a non-polar TPE composition, the decorative tape is constituted by a transparent film layer, a backing layer, and a decorative portion layer interposed therebetween. The backing layer forming material is a resin composition containing the same kind of resin polymer as a hard phase-forming polymer of the non-polar TPE or containing a resin polymer having a melting point of not lower than 100° C. and capable of being fusion-bonded to the hard phase-forming polymer of the non-polar TPE.

7 Claims, 2 Drawing Sheets

DECORATIVE TAPE ADHESIVE MOLDING

BACKGROUND OF THE INVENTION

1. Field of the Invention

The present invention relates to a decorative tape adhesive molding and particularly to a decorative tape adhesive molding adapted for use as a car bumper molding which is cut into a predetermined length so as to be set up along a curved surface of a bumper.

Although a bright foil-including bumper molding including a decorative tape of bright foil having a decorative portion layer of a metal thin film formed between a transparent resin film layer and a backing layer will be described mainly as an example of the decorative tape adhesive molding, the decorative tape adhesive tape is not limited thereto.

Incidentally, Japanese Patent Publication No. Hei. 4-10, and Japanese Utility Model 7-35792 etc. are preceding related art though they have no influence on the novelty of the decorative tape-including molding according to the present invention.

The present application is based on Japanese Patent Application No. Hei. 10-338132, which is incorporated herein by reference.

2. Description of the Related Art

FIG. 1 is a perspective view showing an example of a bumper 11 to which a molding according to the present invention is applied.

FIG. 2 is a sectional view showing an example of a bright foil-including molding 12 according to the present invention.

FIG. 3 is an enlarged sectional view showing a portion 3 in FIG. 2.

The bright foil-including molding 12 is constituted as follows. Bright foil 16 is fusion-bonded to a molding body 14. A molding body molding material (hereinafter referred to as "body molding material") is a thermoplastic elastomer (TPE) composition. The bright foil 16 is constituted by a backing layer 18, a transparent resin film layer 20, and a metal vapor deposition film (decorative portion layer) 22 interposed therebetween. Though not shown, an adhesive agent layer (primer layer) is generally interposed between the backing layer 18 and the metal vapor deposition layer 22.

The molding body 14 has been molded of a soft polyvinyl chloride (PVC) resin composition mixed with a large amount (50 parts or more) of a plasticizer so as to be given elastomeric characteristic.

For example, a metal vapor deposition film 22 of chrome, or the like, is formed on a transparent resin film (carrier film) (transparent resin film layer 20 ) of polyethylene terephthalate (PET), or the like, by a physical method such as sputtering, ion-plating, thermal vapor deposition, or the like. An adhesive agent is applied onto the metal vapor deposition film 22. A backing sheet (backing layer 18) is adhesively bonded to the metal vapor deposition film 22. The resulting material thus prepared is cut so as to be shaped like a tape for use as the bright foil tape 16.

To fusion-bond the bright foil 16 to the molding body 14, a PVC type resin composition capable of being (thermally) fusion-bonded to the molding body 14 has been used as a resin composition (backing forming material) for forming the backing layer 18.

Incidentally, a pressure-sensitive double coated tape is generally integrally stuck to the back surface of the molding body 14 in order to attach the molding body 14 to a bumper 11.

There is, however, a tendency that use of PVC is limited because of environmental problems of nowadays. For this reason, thermoplastic elastomer (TPE), especially, so-called non-polar TPE such as polyolefin type TPE, polystyrene type TPE, or the like, which is light in weight and excellent in antiweatherability, has been noticed as a substitute for PVC to be used as a molding material for the molding body.

When the molding body is to be molded of one of these non-polar TPE materials, it is necessary that the backing layer 18 on the fusion-bonding side of the bright foil 16 is also formed of a resin composition (backing forming material) containing, as its main component, the same non-polar polymer resin as the non-polar TPE for the purpose of fusion-bonding the backing layer 18 to the molding body.

The inventors, however, have found that sufficient fusion-bonding strength (peel strength) can be hardly obtained (particularly under a high-temperature atmosphere) when bright foil (decorative tape) having a backing layer formed of a polyolefin type resin composition is fusion-bonded to a molding body molded of a polyolefin type TPE composition generally used as non-polar TPE, and that bent portions of the molding body crumples when a bending process is applied to the molding body.

SUMMARY OF THE INVENTION

In view of the above description, an object of the present invention is to provide a decorative tape adhesive molding in which sufficient fusion-bonding strength can be obtained between a molding body and a decorative tape even under a high-temperature atmosphere and in which bent portions of the molding body hardly crumples when a bending process is applied to the molding body.

In the process of eagerly trying to make development to solve the aforementioned problem, the inventors have found that the aforementioned problem can be solved when the main-component resin of the non-polar resin composition for forming the backing layer of the decorative tape is constituted by the same kind polymer as the hard phase-forming polymer of non-polar TPE and the tensile modulus of elasticity of the backing layer is selected to be not smaller than a predetermined value. Thus, the inventors have concluded by thinking out a bright foil-including molding having the following configuration.

A decorative tape-including molding comprises a molding body made of a molding body forming material (body molding material) containing a non-polar thermoplastic elastomer (non-polar TPE) as a base polymer, and a decorative tape integrally fusion-bonded to the molding body, the decorative tape including a transparent resin film layer, a backing layer made of a resin composition (backing forming material) capable of being fusion-bonded to the body molding material, and a decorative portion layer interposed between the transparent resin film layer and the backing layer. The backing forming material is constituted by a resin composition containing the same kind of polymer as a hard phase-forming polymer of the non-polar TPE or containing a resin polymer having a melting point of not lower than 100° C. and capable of being fusion-bonded to the hard phase-forming polymer of the non-polar TPE.

To secure sufficient fusion-bonding strength, the amount of the same kind of polymer contained in the backing forming material as the hard phase-forming polymer of the non-polar TPE is preferably not smaller than a value enabling the polymer to form a sea phase (continuous dispersion phase).

In the configuration, it is preferable from the point of view of preventing the molding from crumpling in a molding-bending process that the tensile modulus of elasticity (ASTM D 638) of the backing layer is from 80 to 1000 MPa.

When, in the above description, the transparent resin film layer of the decorative tape is made of polyethylene terephthalate (PET) and applied to a molding which crumples easily in the molding-bending process, the effect of the present invention becomes remarkable desirably.

When the body molding material is polyolefin type TPE (TPO) containing a hard phase of polypropylene (PP), it is preferable, from the double points of view of fusion-bonding characteristic of the backing layer to the molding body and prevention of crumpling of the molding body, that the backing forming material is a resin composition containing 50% by weight of random PP.

Incidentally, when the transparent resin film layer of the decorative tape is made of a polyfluorocarbon type resin, the problem of crumple occurrence in the molding body is not required to be taken into account. As a result, the tensile modulus of elasticity of the backing layer is not required to be in the predetermined range as in the case where the transparent resin film layer is made of PET.

Incidentally, in any case, it is preferable from the point of view of securing fusion-bonding strength that the amount of random PP is not smaller than 70% by weight.

Features and advantages of the invention will be evident from the following detailed description of the preferred embodiments described in conjunction with the attached drawings.

DETAILED DESCRIPTION OF THE PREFERRED EMBODIMENTS

Figure 1:
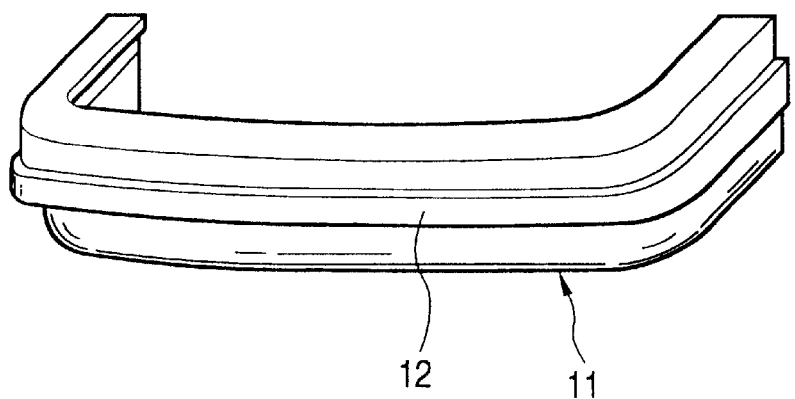
FIG. 1 is a perspective view showing an example of a bumper to which a molding according to the present invention is applied.

Embodiments of the present invention will be described below. Incidentally, the unit/ratio of mixture is a unit/ratio by weight unless there is any previous special notice.

An embodiment will be described while the case where the present invention is applied to the aforementioned bright foil-including lace is taken as an example.

As described above, the bright foil tape 16 is constituted by a metal vapor deposition film (decorative portion layer) 22 of Cr, or the like, formed between a transparent resin film layer 20 and a backing layer 18 which are made of PET. The transparent resin film layer 20 is also made of PET.

The molding body 14 to which the bright foil tape 16 is fusion-bonded is formed of an olefin type TPE (TPO) composition having a hard phase of polypropylene (PP).

Specifically, as the TPO composition, used is that in which the amount of PP serving as a hard phase (arresting layer) is adjusted so that the tensile modulus (Young's modulus) of elasticity (ASTM D 638) is in a range of from 100 to 600 MPa, preferably from 150 to 500 MPa. From the point of view of miscibility of PP to a rubber component (ethylene-propylene copolymer type rubber: EPR), it is preferable, as the PP, to use a block copolymer of PP and a small amount (0.5 to 10% by weight) of ethylene. The amount of PP to achieve such characteristic is selected to be generally from 20 to 60% by weight, preferably from 35 to 55% by weight.

Although the molding body 14 is generally molded by extrusion molding, the molding body 14 may be formed by cutting a sheet material or may be molded by injection molding, or the like.

In this embodiment, the backing forming material is constituted by a resin composition containing a sufficient amount of random PP capable of forming a matrix phase, that is, generally containing 50% by weight or more of random PP, preferably containing 70% by weight or more of random PP, more preferably containing 80% by weight or more of random PP. In addition, the tensile modulus of elasticity (ASTM D 638) of the backing layer 18 is adjusted to be from 80 to 1000 MPa, preferably from 100 to 850 MPa, more preferably from 100 to 400 MPa.

If the amount of random PP is smaller than 50% by weight, sufficient fusion-bonding strength can be hardly obtained between the backing layer 18 and the molding body 14. If the tensile modulus of elasticity is smaller than 80 MPa, the molding crumples easily when a bending process is applied to the molding. If the tensile modulus of elasticity is contrariwise larger than 1000 MPa, the flexibility of the molding as a whole is impeded. As a result, there is a risk that the molding may be peeled partially because an elastic rebound occurs in a bent portion of the molding after the molding is attached to the bumper 11 by a pressure-sensitive double coated tape 24, or the like.

As the PP, it is possible to use homogeneous PP or block PP used in a TPO composition. However, it is preferable to use random PP because the tensile modulus of elasticity in the aforementioned range can be obtained easily in the random PP.

As the rubber component for forming a soft phase (soft segment) in the aforementioned TPO composition, there is generally used ethylene-propylene rubber (EPR), which comprises ethylene-propylene copolymer (EPM) and/or ethylene-propylene-diene terpolymer (EPDM) which is obtained by copolymerizing EPM with unconjugated diene. The rubber component may be ethylene-α-olefin type copolymer prepared by replacement of the whole or part of propylene with different α-olefin having 4 or more carbons, such as 1-butene, 1-hexene, 1-heptene, 4-methyl-1-pentene, 1-octene, or the like.

The TPO composition may be of a general-purpose kneading type or may be of any other type such as a partial cross-linking type for partially cross-linking the rubber component with organic peroxide, a dynamic cross-linking type for fully cross-linking the soft phase at kneading time, or the like.

As crystalline polymer for forming a hard phase (arresting phase: hard segment) in the TPO composition, not only PP (melting point of about 170° C.) but also another olefin type polymer using α-olefin having 4 or more carbons as monomer may be used. One kind of olefin type polymer may be used or two or more kinds of olefin type polymers may be used in combination. An olefin type polymer having a melting point of from 100 to 250° C. can be preferably used as the olefin type polymer. If the melting point is too low, sufficient fusion-bonding strength can be hardly obtained. If the melting point is too high, there is a fear of shortage of miscibility to the rubber component. Specific examples of the olefin type polymer include poly(1-butene) (126 to 140° C.), poly(3-methyl-1-pentene) (235 to 240° C.), poly(4-methyl-1-hexene) (188 to 200° C.), poly(5-methyl-1-hexene) (110 to 130° C.), and so on. Incidentally, numerical values in parentheses mean the respective melting points quoted from "MARUZEN'S Dictionary of Macromolecules", translated by Tadachi, MARUZEN, Sep. 20, 1994, p176.

From the point of view of moldability, or the like, a fluidity giving material such as paraffinic oil, a lubricant, or the like, may be mixed with the TPO composition and an auxiliary material such as a pigment, a dye, an inorganic filler, or the like, may be further mixed with the TPO composition.

When the aforementioned crystalline poly-α-olefin is used as the hard phase polymer, a resin composition containing the same kind of olefin type polymer as the hard phase polymer is generally used as the backing forming material. If the backing forming material has a melting point of not lower than 100° C. (preferably not lower than about 130° C., more preferably not lower than 150° C.) so as to be able to be fusion-bonded to the molding body, the olefin type polymer used, however, may be selected from the aforementioned, other kinds of olefin type polymers.

When, for example, the hard phase-forming polymer contained in the TPO composition is PP, the same kind of PP is used. With respect to the kind of PP, random copolymer having a relatively low modulus of elasticity is preferably used as PP because the aforementioned range of the tensile modulus of elasticity is obtained easily.

Incidentally, the terminology "fusion bonding" generally contains not only fusion bonding (hot-air welding, ultrasonic welding) but also solvent bonding.

When, in the above description, the transparent resin film layer 20 of the bright foil (decorative tape) 16 is made of another transparent resin such as a polyfluorocarbon type resin than PET, the tensile modulus of elasticity of the backing layer is not always required to be in the aforementioned range because the tensile modulus (Young's modulus) of elasticity of fluorocarbon per se is about 500 MPa so that crumpling in the molding body at the time of bending is not required to be taken into account.

Further, the decorative tape 16 is not limited to the aforementioned bright foil 16. For example, a decorative tape 16 having a decorative portion layer 22 formed of ceramic powder (seashell powder, etc.) or a printing sheet instead of the metal vapor deposition film or formed by printing, transferring, or the like, on the back surface of the transparent resin film layer 20 may be used. In this case, a masking agent such as a white pigment, or the like, is preferably mixed with the backing forming material so that the background color of the molding body 14 does not have influence on the decorative portion layer 22. Further, an auxiliary material such as a lubricant, an inorganic filler, an organic filler, or the like, may be mixed with the backing forming material suitably.

Further, styrene type TPE can be used also as the non-polar TPE composition for forming the molding body.

Examples of the styrene type TPE include tri-block copolymers such as polystyrene/polybutadiene/polystyrene (SBS), polystyrene/polyisoprene/polystyrene (SIS), etc., and those hydrogenated such as SEBS, SEPS, hydrogenated SBR, vinyl SIS, etc.

In the case of styrene type TPE, the hard phase is made of polystyrene. Accordingly, in this case, it is preferable that 50% by weight or more of the same kind of polystyrene is contained in the resin composition of the backing forming material. To adjust the modulus of elasticity, a well-miscible resin or elastomer such as polystyrene, poly(m-methylstyrene), styrene type TPE, SBR, or the like, may be mixed by an amount smaller than 50% by weight.

The bright foil-including molding (decorative tape-including molding) according to the present invention is produced by a commonly used method. For example, just after a molding body 14 is extruded, bright foil (decorative tape) 16 is pressed against and fusion-bonded to the molding body 14 to thereby prepare a continuous molding. After or before the continuous molding is cut, a pressure-sensitive double coated tape is stuck to the molding to thereby produce the bright foil-including molding.

Figure 2:
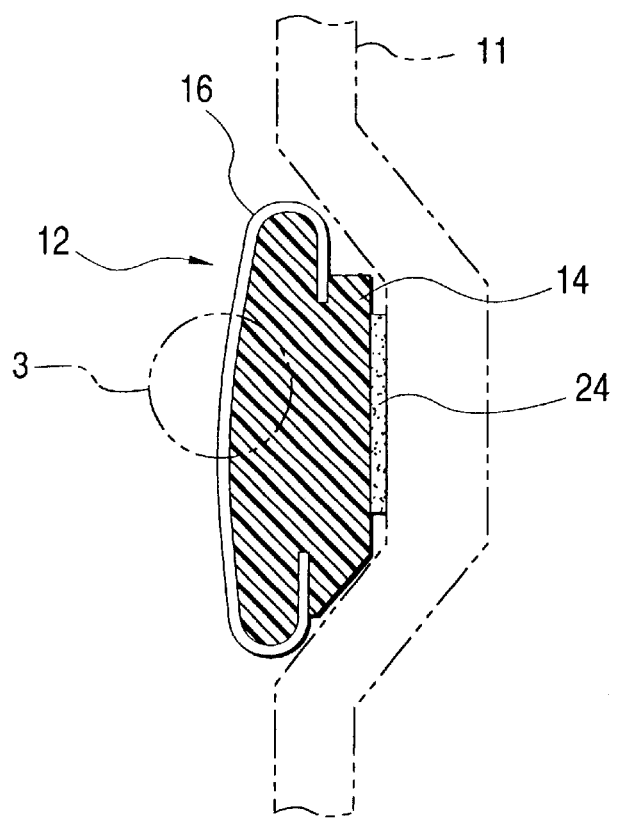
FIG. 2 is a sectional view showing an example of the bright foil-including molding according to the present invention.
Figure 3:
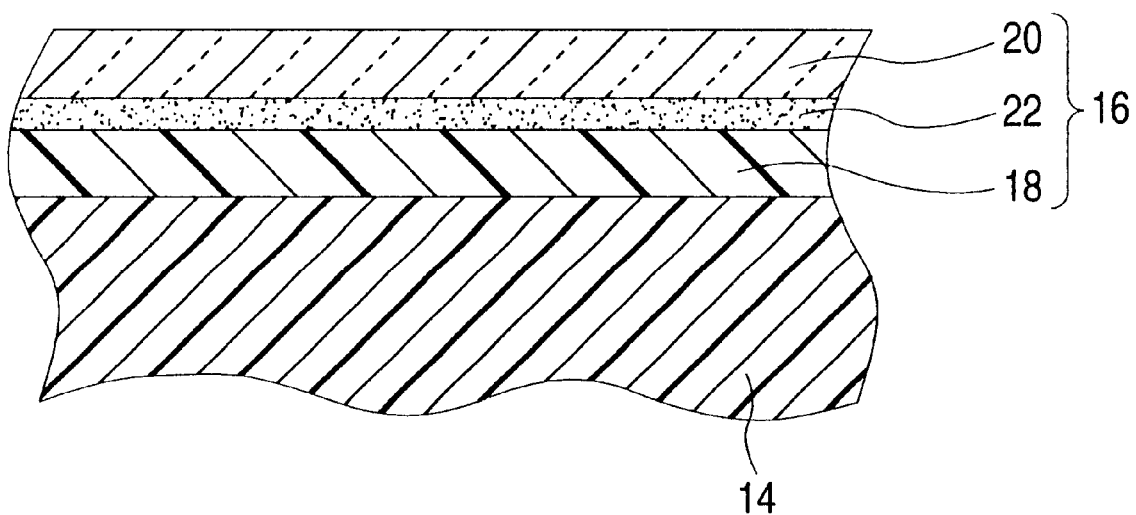
FIG. 3 is an enlarged sectional view of a portion 3 in FIG. 2.

The bright foil-including molding thus produced is attached to a bumper, or the like, shown in FIG. 2 in a car. In this occasion, not only crumpling is prevented from occurring in the bent portions of the molding body 14 even in the case where the tensile modulus of elasticity of the transparent resin film layer of the bright foil is high but also peeling is prevented from occurring between the molding body 14 and the bright foil 16 even under a high-temperature atmosphere.

The reason why crumpling is prevented from occurring cannot be decided clearly. It is, however, assumed that this is because the neutral axis of the bending moment moves inward so that compressional stress acting on the back surface of the molding body is relatively reduced when the modulus of elasticity of the backing layer is selected to be not smaller than a predetermined value.

Further, the reason why fusion-bonding force increases is assumed as follows. When the backing layer-forming material contains the same kind of polymer as the hard phase-forming polymer of the TPE composition or contains a relatively high heat-resistant polymer having a melting point of not lower than 100° C. (generally, the amount of the polymer is equal to or nearly equal to the amount of a sea phase), it is assumed that not only fusion bonding to the molding body phase is secured but also heat resistance of peel strength increases.

In the decorative tape-including resin molding according to the present invention, as described above, the backing forming material for the decorative tape is a resin composition containing the same kind of resin polymer as the hard phase-forming polymer of non-polar TPE which is a molding material for the molding body.

When the tensile modulus of elasticity of the backing layer is selected to be in a predetermined value range, sufficient fusion-bonding strength (peel strength) is obtained between the molding body and the decorative tape as supported by the following examples.

Further, even in the case where the modulus of elasticity of the transparent resin film layer of the decorative tape is high, the molding hardly crumples at the time of bending when the modulus of elasticity of the backing forming material for the decorative tape is selected to be in the predetermined range.

Examples (E-1 to E-4) and comparative examples (C-1 to C-4) carried out to confirm the effect of the present invention will be described below.

(1) Preparation of Samples

Each of the following TPE compositions was used as the molding body molding material. Foil having a backing layer formed of each of the following backing forming materials was used as the bright foil. Incidentally, the bright foil was formed to have a 0.05 mm-thick transparent resin film layer (made of PET or FEP), a decorative portion layer formed by Cr sputtering, and a 0.15 mm-thick backing layer.
TPE Composition
TPO-1: low-density polyethylene (PE)/chlorinated PE/partially crosslinked EPDM=20/30/50
TPO-2: block PP/partially crosslinked EPDM/paraffinic oil= 40/50/10
TPO-3: block PP/partially crosslinked EPDM/paraffinic oil= 50/45/5
Backing Forming Material
Backing Forming Material-1: random PP/EPM/low-density PE=14/28/58
Backing Forming Material-2: random PP/EPM=85/15
Backing Forming Material-3: random PP/EPM=98/2

The molding was prepared as follows. Just after the molding body was extruded in the condition (material melting temperature: 190° C., extrusion rate: 1 m/min) by use of each of the aforementioned TPO compositions, the bright foil having each of the backing forming materials, and the transparent resin film layer was fusion-bonded to the molding body.

Each of the moldings thus prepared was tested with respect to the following items.
<180° Peel Test>
Two slits each having a size of 6 mm wide×10 mm long were formed in the bright foil of the molding. This test was performed by a tensilometer (TENSILON) while an end portion peeled from the molding body was pulled in a direction of 180° at a pulling rate of 50 mm/min. Incidentally, a heat run test was performed in an atmosphere of 80° C. after the sample piece was left in the atmosphere for one hour.

Data 6 mm wide were converted into data 15 mm wide. When the transparent resin film layer was made of PET, 30 N/15 mm or more was regarded as an acceptable range. When the transparent resin film layer was made of FEP, 7 N/15 mm or more was regarded as an acceptable range. This was because the strength of PET was sufficiently higher than that of FEP.

Results of the test are shown in Table 1. It is apparent from Table 1 that sufficient fusion-bonding strength is obtained under room-temperature and heating atmospheres in any one of examples satisfying there quisites for the present invention. It is further apparent that sufficient fusion-bonding strength is hardly obtained in α-olefin such as low-density PE (soft PE) difficult to form a hard phase even in the case where the α-olefin is contained in the backing forming material.

<Bending Test>
The molding was stuck to a 90°-crossed corner portion with a curvature radius of 50 mm. In this condition, a judgment was made by eye observation as to whether a side surface of the molding body crumpled or not.

Results of the test were as shown in Table 1 (*: The numerical value in parentheses is the tensile modulus of elasticity.). In any one of examples satisfying the requisites for the present invention, crumpling did not occur. Incidentally, when the transparent resin film layer of the bright foil was relatively soft, crumpling did not occur in any one of examples and comparative examples.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

TABLE 1

|  |  | Amount of PP | C-1 | C-2 | C-3 | E-1 | E-2 | E-3 | C-4 | E-4 |
|---|---|---|---|---|---|---|---|---|---|---|
| Bright Foil | Transparent Resin Film Layer |  | PET | PET | PET | PET | PET | PET | FEP | FEP |
|  | Backing Forming Material-1 (40 MPa)* | 14% | o | o |  |  |  |  | o |  |
|  | Backing Forming Material-2 (130 Mpa)* | 85% |  |  | o | o |  | o |  | o |
|  | Backing Forming Material-3 (350 MPa)* | 98% |  |  |  |  | o |  |  |  |
| Base Material | TPO-1 (30 MPa)* | 0% | o |  | o |  |  |  |  |  |
|  | TPO-2 (210 MPa)* | 40% |  | o |  | o | o |  | o | o |
|  | TPO-3 (400 MPa)* | 50% |  |  |  |  |  | o |  |  |
| Peeling Strength (N/15 mm) |  | 23° C. | 58 (o) | 14 (x) | 24 (x) | 92 (o) | 105 (o) | 95 (o) | 15 (o) | 23 (o) |
|  |  | 80° C. | 2 (x) | 1 (x) | 5 (x) | 56 (o) | 68 (o) | 62 (o) | 1.6 (x) | 11 (o) |
| Crumpling |  |  | x | x | o | o | o | o | o | o |

What is claimed is:
1. A decorative tape adhesive molding comprising:
   a molding body comprising a non-polar thermoplastic elastomer; and
   a decorative tape integrally fusion-bonded to said molding body, said decorative tape including:
      a transparent resin film layer;
      a backing layer comprising a resin composition being fusion-bonded to said molding body; and
      a decorative layer formed between said transparent resin film layer and said backing layer,
      wherein said resin composition of said backing layer contains one of the same kind of resin polymer as a hard phase-forming polymer of said non-polar thermoplastic elastomer of said molding body and a resin polymer having a melting point of not lower than 100° C. and capable of being fusion-bonded to said non-polar thermoplastic elastomer, and
      wherein said resin composition of said backing layer contains the same kind of resin polymer as the hard phase-forming polymer of said non-polar thermoplastic elastomer of said molding body so that an amount of said resin polymer in said resin composition of said backing layer is not smaller than a value capable of forming a matrix phase, and
      wherein a tensile modulus of elasticity according to ASTM D 638 of said backing layer is in a range of from 80 to 400 MPa, and wherein said molding comprises an olefin thermoplastic elastomer composition having a hard phase of polypropylene, and said resin composition of said backing layer contains 50% by weight or more of random polypropylene.

2. The decorative tape adhesive molding of claim 1, wherein a soft phase of said olefin thermoplastic elastomer composition of said molding body comprises ethylene-propylene rubber.

3. A decorative tape adhesive molding comprising:

a molding body comprising a non-polar polyolefin thermoplastic elastomer containing a hard phase of polypropylene; and a decorative tape integrally fusion-bonded to said molding body, said decorative tape including:

a transparent resin film layer comprising polyethylene terephthalate;

a backing layer comprising a resin composition being fusion-bonded to said molding body, said resin composition containing 50% by weight or more of random polypropylene; and a decorative layer formed between said transparent resin film layer and said backing layer, wherein a tensile modulus of elasticity according to ASTM D 638 of said backing layer is a range of from 80 to 400 MPa.

4. A decorative tape adhesive molding comprising:

a molding body comprising a non-polar polyolefin thermoplastic elastomer containing a hard phase of polypropylene; and a decorative tape integrally fusion-bonded to said molding body, said decorative tape including:

a transparent resin film layer comprising a polyfluorocarbon type resin; and a backing layer comprising a resin composition being fusion-bonded to said molding body, said resin composition containing 50% by weight or more of random polypropylene; and a decorative layer formed between said transparent resin film layer and said backing layer, wherein a tensile modulus of elasticity according to ASTM D 638 of said backing layer is in a range of from 80 to 400 MPa.

5. A decorative tape adhesive molding according to claim 4, wherein said resin composition of the backing layer 70% by weight or more of the random polpropylene.

6. A decorative tape adhesive molding according to claim 5, wherein said transparent resin film layer of said decorative tape comprises polytetrafluoroethylene-hexafluoropropylene copolymer.

7. A decorative tape adhesive molding according to claim 4, wherein said transparent resin film layer of said decorative tape comprises polytetrafluoroethylene-hexafluoropropylene copolymer.

* * * * *